United States Patent

Shen et al.

(10) Patent No.: US 6,490,611 B1
(45) Date of Patent: Dec. 3, 2002

(54) USER LEVEL SCHEDULING OF INTER-COMMUNICATING REAL-TIME TASKS

(75) Inventors: Chia Shen, Arlington, MA (US); Oscar J. González Gomez, Amherst, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/239,583

(22) Filed: Jan. 28, 1999

(51) Int. Cl.[7] .............................................. G06F 9/00
(52) U.S. Cl. ....................... 709/103; 709/100; 709/107
(58) Field of Search ................................ 709/100, 101, 709/102, 103, 104, 5, 322, 332; 710/200; 714/2

(56) References Cited

U.S. PATENT DOCUMENTS 4,658,351 A * 4/1987 Teng ........................... 709/103
5,519,867 A * 5/1996 Moeller et al. .............. 709/107

OTHER PUBLICATIONS

Thomas Riechmann, Jürgen Kleinöder; "User–Level Scheduling with Kernel Threads;" Technical Report, TR–14–96–05; Friedrich Alexander University, Erlangen-–Nürnberg, Germany; Jun. 1996.

* cited by examiner

Primary Examiner—Majid Banankhah
(74) Attorney, Agent, or Firm—Dirk Brinkman

(57) ABSTRACT

In a multi-tasking system a writer task generates real-time and non real-time messages having multiple priority levels in an ascending order arranged in a plurality of priority bands. The real-time messages have predetermined timing deadlines. A plurality of queues indexing the messages by pointers, there is one queue for each priority band. A dispatcher moves pointers from a lower priority queue to a higher priority queue in response to a time-out signal dependent on the timing deadline. A data push agent transmits the messages indexed by the pointers according to the multiple priority levels.

13 Claims, 3 Drawing Sheets

USER LEVEL SCHEDULING OF INTER-COMMUNICATING REAL-TIME TASKS

FIELD OF THE INVENTION

This invention relates generally to multi-tasking computer systems, and more particularly, to user level scheduling of real-time tasks that inter-communicate over a network.

BACKGROUND OF THE INVENTION

It has become evident that real-time applications, such as process control, factory automation, and plant control are moving to use open, standard, commercially available, and more general purpose computers, operating systems (OS), and networks. In other words, users would prefer to implement their applications with low-cost and readily available off-the-shelf hardware and software components.

For example, users would like to replace expensive workstations with off-the-shelf PCs. Users would like to adopt standard PC operating systems for real-time control. There is also a lot of momentum toward using the Internet Protocol (IP) for control networks. As control and device-level networks, general purpose IP-based networks offer cost and support advantages over industrial field buses.

In addition, more and more desktop applications are starting to employ real-time elements, such as the presentation of continuous media, e.g., video streams, and the remote control of instruments and devices in distant learning environments. This potential for using general purpose components for a wide spectrum of real-time tasks has prompted many contemporary general purpose operating systems to offer some minimal degree of real-time scheduling and programming support.

However, there are still problems in trying to build distributed systems with real-time functionality using off-the-shelf hardware and software components. This is primarily due to the fact that off-the-shelf components are not necessarily designed with real-time functionality in mind. In particular, to realize end-to-end predictability, say, when a process on one computer sends data to a process on another computer over a network, there are several specific problems.

Real-time application requirements must be mapped into requirements imposed on the schedulable entities of the system, e.g., tasks. Predictable execution of the tasks must be ensured in the face of possible priority inversions, limited OS level real-time scheduling support, and limited number of priorities. Real-time and non real-time tasks must be integrated in the hardware environment.

In the prior art, scheduling support for integrating real-time and non real-time tasks has been done by either extending existing operating systems, or by virtualizing the underlying hardware to multiplex a real-time kernel with the operating system. These approaches have certain drawbacks. The first approach needs to modify the existing operating system. However, access to the source programs of the operating system might not always be available. With the second approach, it is difficult to support real-time and non real-time activities that are closely related, e.g., in the case where there are multiple execution threads associated with the process, and there is a need by the tasks to share a common address space.

The current generation of operating systems has produced versions that provide some support for real-time scheduling, such as non-degradable priorities, and real-time threads. Support for these scheduling functions is not present in the older generation of these operating systems. For example, Windows NT 4.0 provides a REALTIME class such that threads in this class have non-degradable priorities.

Executing threads in this class have precedence over timesharing threads. These newer OS versions also provide timers with one millisecond granularity, and periodic callback routines which can be used for real-time periodic tasks. Real-time applications require that tasks are scheduled, executed, and completed with predictable and bounded variability in time. In reality, predictability comes in different granularities.

At one end of the spectrum, the direct physical control of robots, devices and instruments by local loop controllers, embedded controllers and PLCs may require sub-millisecond to one millisecond delay bounds. Unfortunately, the effects of nondeterminism present in many operating systems make it impractical to design user level scheduling to support real-time tasks with sub-millisecond precision. These types of tasks are better served by real-time kernels.

At the other end of the spectrum, a maximum delay or deadline value of one second is good enough for a video-on-demand file server, or database transactions for financial tasks. These tasks can be directly built with existing operating system primitives.

In the middle of the spectrum, there is a large population of real-time tasks that can tolerate end-to-end roundtrip delay/response time in the tens to hundreds of milliseconds range. These tasks often involve the interaction between users and remote data collection, video monitoring, file accessing, and command issuing in order to view videos, monitor, and control devices at a distance.

In any case, there is a need for a system where users can specify real-time scheduling of activities even when the system is configured with standard off-the-shelf components that do not necessarily include real-time capabilities.

SUMMARY OF THE INVENTION

The invention provides a multi-tasking distributed computer system with user level scheduling of the transmission of real-time and non real-time messages. The real-time messages having predetermined timing deadlines. At least one writer task generates the real-time and non real-time messages. The messages can have multiple priority levels organized in a plurality of priority bands, for example four. The generated messages are stored in ring buffers of a reflective memory and are indexed by pointers stored in queue entries. Pointers in a fourth queue index the real-time messages having low priority levels. Pointers in a third queue index the non real-time messages. A first and second queue store pointers for indexing the high and highest priority real-time messages, respectively.

A dispatcher moves pointers from the fourth to the second queue in response to time-out signals. The time-out signals ensure that the timing deadlines are met. A data push agent transmits the messages indexed by the pointers in the queues according to the associated priority levels. A reader task receives the messages transmitted by the data pusher agent.

In one aspect of the invention, the writer and reader tasks execute on different nodes of the system, and the nodes are connected by a network.

DETAILED DESCRIPTION OF PREFERRED EMBODIMENTS

System Overview

Figure 1:
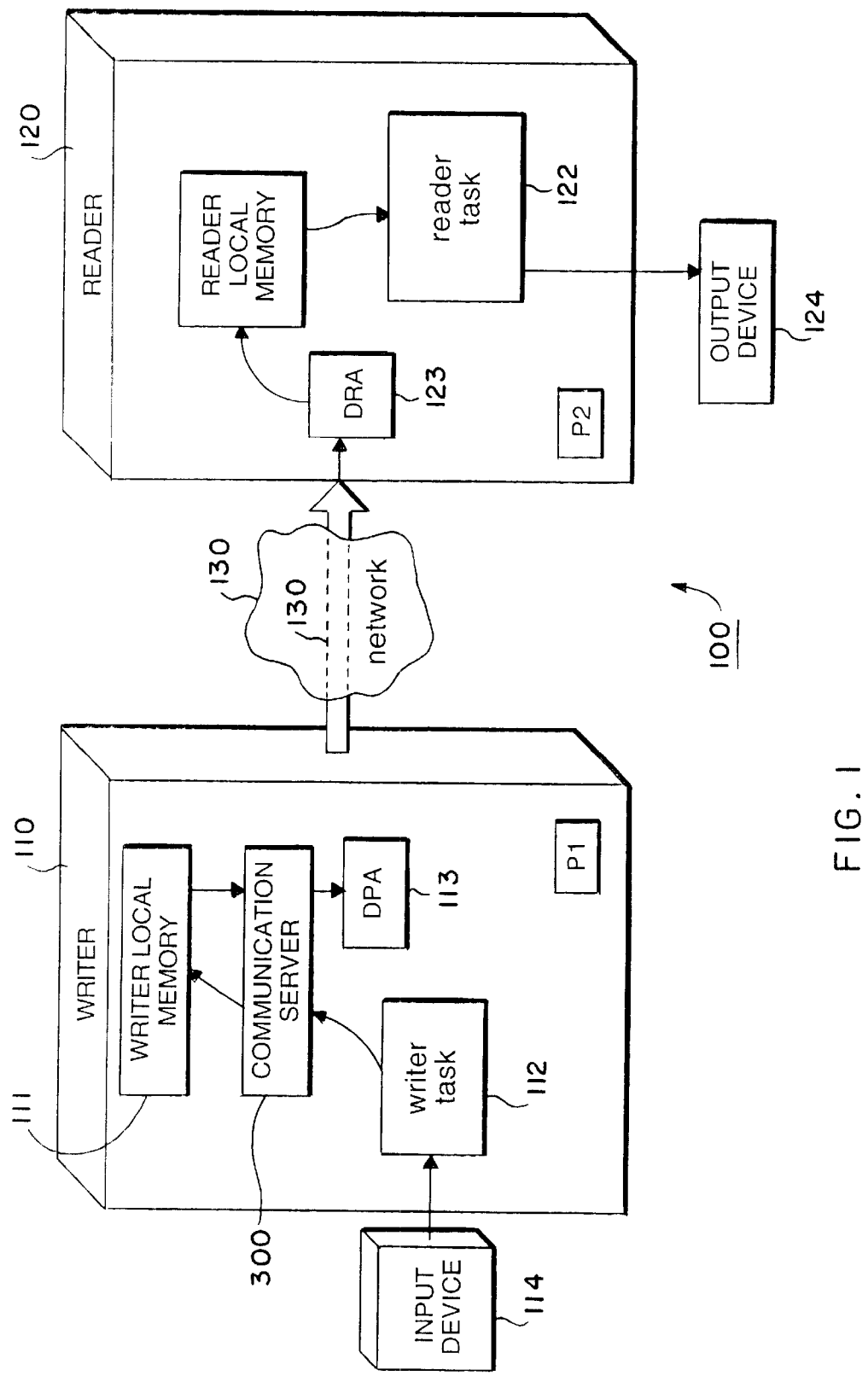
FIG. 1 is a block diagram of a distributed computer system that uses the user level scheduling according to the invention.

FIG. 1 shows a distributed multi-tasking system 100 that employs the user level scheduling according to our invention. The system 100 includes a writer node 110 connected to a reader node 120 by a network 130.

The writer node 110 includes a writer memory 111, a writer task 112, and a data push agent (DPA) 113. The reader node 120 includes a corresponding reader memory 121, a reader task 122, and a data receive agent (DRA) 123. In our system, the memories 111 and 121 are reflective as described in U.S. patent application Ser. No. 08/760,110 "Real-time Channel-Based Reflective Memory" filed on Dec. 3, 1996 by Shen et al. incorporated herein by reference.

System Operation

During operation of the system 100, data can be acquired from a real-time data input device 114, such as a sensor. The data are written to the reflective memory 111 by the writer task 112. The data are transmitted from the writer node to the reader node over a virtual memory channel 131 of the network 130 by the DPA 113. The data are received by the DRA 123. The reader task 122 can read the data from its local reflective memory 121, and render the data on an data output device 124, such as a display terminal.

It should be noted that the system 100 can include multiple nodes and tasks performing concurrent data transfer operations. A reader task can only receive data from one writer task at the time, although one writer task can concurrently transmit data to multiple reader tasks.

We prefer to build the system 100 using standard off-the-shelf hardware and software components. In addition, we would like our system to have real-time operating system characteristics. Unfortunately, as stated above, off-the-shelf hardware and software components are not necessarily designed specifically for real-time applications. In particular, to realize end-to-end predictability, while the writer node transmits data to the reader node, several problems must be addressed.

First, real-time requirements of the task must be mapped into requirements imposed on schedulable entities of the system. Second, predictable execution must be ensured in the face of possible priority inversions, limited operating system level real-time scheduling support, and limited number of priorities. And third, both real-time and non-real-time activities must be integrated in the system.

We describe solutions to these challenging problems. In particular, we enable user-level real-time scheduling using a communication server 300. Our user level scheduling is practical because it is based on simple primitives that can be found in most of today's commonly used operating systems. We have implemented embodiments of our user level scheduling for PCs executing the Windows NT operating system connected by Ethernet local area networks using the UDP/IP protocol.

Task Characteristics

Contemporary operating systems, such as NT™, IRIX™ and Solaris™, typically include the following scheduling features: preemptive priority-based scheduling, round-robin scheduling, non-degradable priorities, mechanisms for priority adjustment, and periodic timers that can trigger periodic events and release execution of threads.

For the purpose of real-time scheduling, there are some problems with these features. Typically, there is no priority inheritance among executing processes or threads, and there is no priority tracking from user threads to system level or network protocol stack threads.

These shortcomings make real-time end-to-end predictable scheduling with network communication very difficult. For example, the order of execution of "socket" level calls do not necessarily respect the priorities assigned to the threads which make the socket calls. Here, the term socket is used to describe the actual connection that is used to transmit data from the sender to the receiver.

Also, there usually are a limited number of priorities. This means that it is not always possible to assign a unique priority to each possible real-time task. Also, lacking is specific support for specifying, and guaranteeing timing constraints of tasks, other than basic priority-based scheduling. This implies that priority assignment policies must guarantee timing constraints beforehand.

Data Transfer Characteristics

Tasks that execute on the system 100 can have any of the following data transfer characteristics. Some tasks, such as a task that is responsive to sporadic user issued commands, needs to transmit data to the reader task immediately after the command is generated, and the data need to be read immediately upon receipt.

In other tasks, such tasks that periodically acquire and display video images, for example, a security monitoring system, the writer and reader can execute at their own pace. For example, a camera can acquire data at a rate of thirty frames per second, while the video can be displayed at a rate of fifteen frames per second, at least during normal operating conditions.

Based on these and other observations, we define the following set of basic data transfer operations that the system and user level scheduling must support.

Data Sending Operations

Synchronous Data Write: Data send operations are triggered by task writes. Asynchronous Data Write: Data are sent periodically, and the period of sending is independent of the period of writing the data.

Data Receiving Operations

Synchronous or Blocking Read: Execution of the reader task is suspended while awaiting the arrival of data from a writer task. When the data are received, the reader task is signaled to continue operation and process the received data.

Asynchronous or Non-Blocking Read: Execution of the reader task can be continuous, and the responsibility for detecting received data lies with the reader task.

In some sense, the synchronous and asynchronous data transfer modes correspond to event-based and state-based approaches. In the event-based approach, there is a reaction to each event as the event occurs. In the state-based approach, there is a reaction to the current state. We allow both modes to co-exist.

Types Of Data Transfer Operations

The different types of data transfer operations are summarized in Table A.

TABLE A

| Combined | Data Type | Deadline | Task |
|---|---|---|---|
| SB | Sporadic | G | Issue Command |
| AN | Periodic | G | Trend Graph |
| SB | Sporadic | G | Sensor Data |

TABLE A-continued

| Combined | Data Type | Deadline | Task |
|---|---|---|---|
| AN | Periodic | G | Video |
| SB | Sporadic | NG | Background |

In the Table A, SB = synchronous blocking, AN = asynchronous non-blocking, G = guaranteed, NG = no guarantee.

Server-based User Level Scheduling

In the following sections, we describe our invention in greater detail. Aspects of our invention include mapping of task requirements into schedulable entities, end-to-end scheduling of tasks with limited number of priorities, and accommodating both real-time and non-real-time tasks in the same system configured with standard off-the-shelf hardware and software components.

Mapping of Task Requirements

Our mapping of task requirements accommodates the precedence constraints imposed by the communicating tasks.

End-to-End Maximum Delay Guarantees

Figure 2:
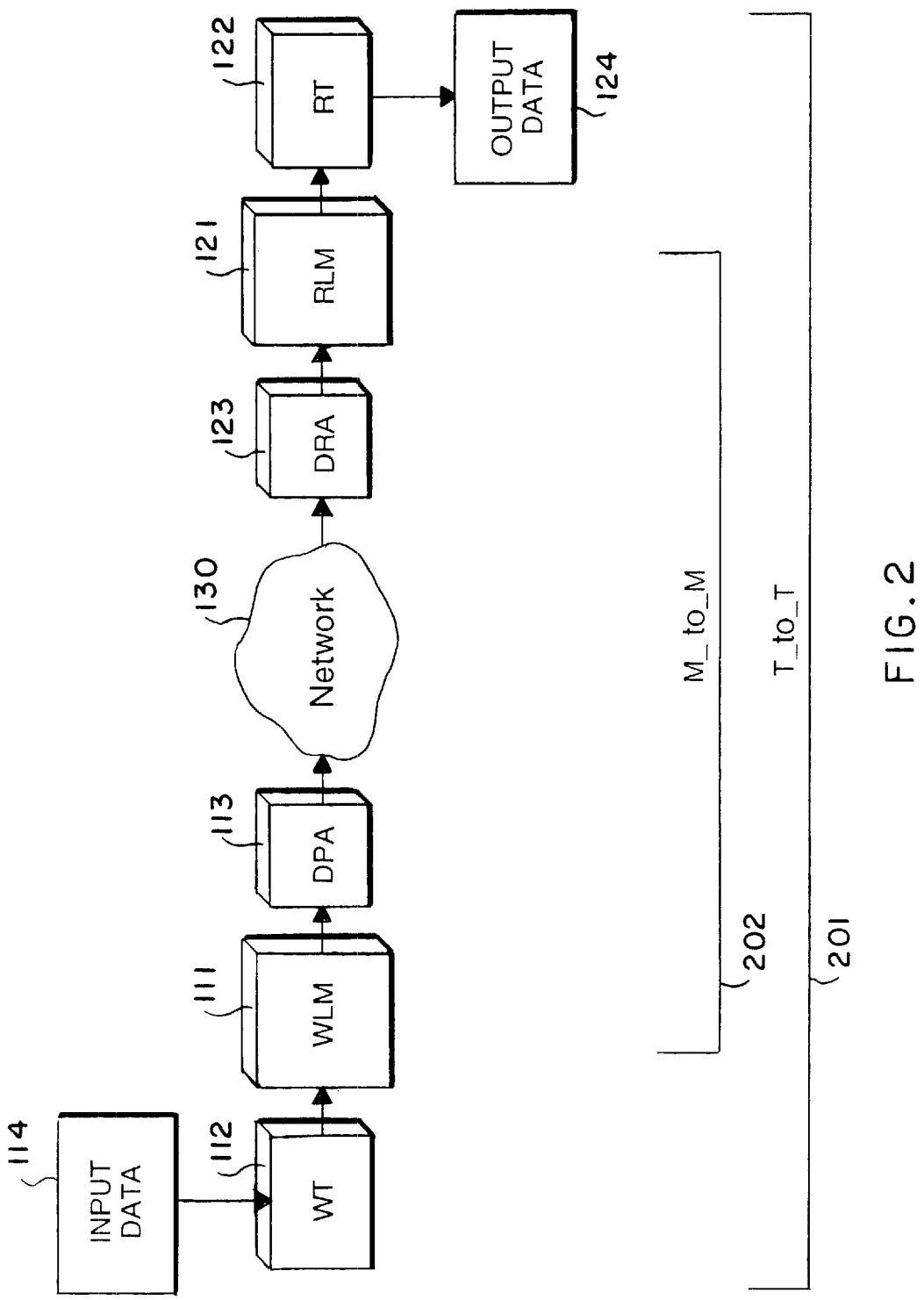
FIG. 2 is a block diagram of an end-to-end data communication path.

FIG. 2 shows the components involved in end-to-end computations and communications. The end-to-end computation and communication entities include the tasks 112 and 122 that write and read data, agents 113 and 123 that send and receive data, and other network interfaces and network transfer protocols 130.

Therefore, the specific schedulable items are the write and read tasks, and the DPA and DRA. In general, the user has no control over the network 130. Two end-to-end spans can be identified. The first span 201 is task-to-task (T-to-T), and the second span 202 is memory-to-memory (M-to-M). Associated with the spans are maximum permissible delays, or deadline guarantees.

Some of the task activities, such as command-and-control, require T-to-T delay (i.e., deadline) guarantees, whereas others, such as trend graphs, only require M-to-M delay guarantees. To support T-to-T maximum delay guarantees, we schedule all the tasks from task writes to task reads as a precedence constrained task graph. On the other hand, to support M-to-M maximum delays, we schedule task writes and reads independently, while treating all the rest of the tasks as one precedence constrained task set.

By definition, synchronous data write operations, as well as blocking read operations impose precedence constraints between the tasks involved, while asynchronous data write, and non-blocking read operations support independent task representation naturally. In particular, a precedence constraint exists between a task write operation and the DPA 113 for synchronous operations, and between the DRA 123 and task read operations for blocking mode.

Model Precedence Constrained Tasks with Release Jitter

To enable the end-to-end scheduling, for both the T-to-T and M-to-M spans, on any node using only priority-based scheduling support, we model precedence constrained tasks as independent periodic tasks with release jitter as follows.

If $J_y$ is the jitter of task entity y, and $C_y$ is the compute time, then in the case of the span T-to-T:

$$J_{write}=0,$$

$$J_{DPA}=C_{write},$$

$$J_{DRA}=J_{DPA}+C_{DPA}+C_{ntwk},$$

and $$J_{read}=J_{DRA}+C_{DRA}.$$

In the case of the span M-to-M:

$$J_{write}=0,$$

$$J_{read}=0,$$

$$J_{DPA}=0,$$

$$J_{DRA}=C_{DPA}+C_{ntwk}.$$

To map task timing requirements into system schedulable components, we take the following approach:

Writer and reader tasks specify their maximum permissible delay, synchronous or asynchronous data reception, as well as blocking or non-blocking data retrieval requirements.

With reference to Table A, timing requirements are mapped as follows:

(1) SB tasks: The period and delay for the writer task are also used for all other tasks over the span T-to-T, and the release jitters of tasks are calculated according to the T-to-T case, as above.

(2) AN tasks: Writer and reader tasks have independent periods and delays. Agent tasks DPA and DRA use the period of the reader task, while the delay is determined as:

$$D_{DRA}=D_{read}-C_{read}$$

$$D_{DPA}=D_{read}-C_{read}-C_{DRA}-C_{ntwk}$$

where C is the time delay due to computations.

The respective release jitters are determined according to the M-to-M case, as described above. Actual timing metrics can be collected by a profiler (P1 and P2 in FIG. 1) described in greater detail below.

Communication Server

We use a "communication server" to handle the problems associated with using off-the-shelf components, i.e., processing messages at the priority of the sending/receiving task priority, minimizing priority inversion, and dealing with limited operating system priority levels. A priority inversion can occur when the transmission of a high priority message is blocked while transmitting a very long low priority message.

All the priority assignments, according to our invention, fall into four priority bands that are related as follows: $P^{one}>P^{two}>P^{three}>P^{four}$, where "one" is the highest priority band, and "four" is the lowest. The manner in which these four priority bands are mapped to specific operating system priority levels depends on the number of priority levels available. The use of these priority bands is described in greater detail below.

Figure 3:
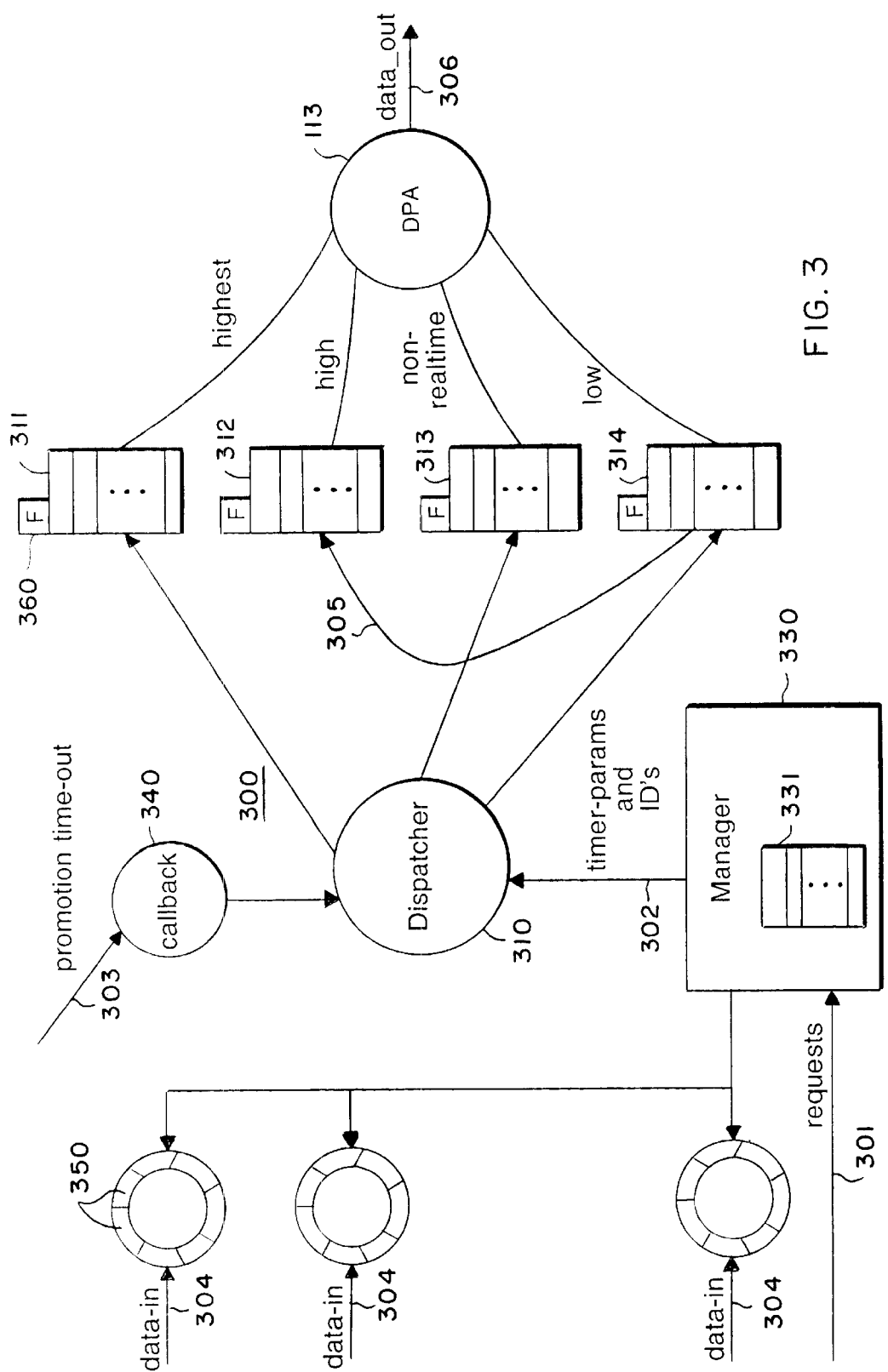
FIG. 3 is a block diagram of a communication server according to the invention.

FIG. 3 shows an asynchronous server 300 according to a preferred embodiment of the invention. The server 300 can be implemented as software programs and data structures on the writer node 110. The server 300 includes a dispatcher 310, a manager 330, and a callback facility 340.

The server 300 also includes multiple queues, one for each priority band for example, four queues 311–314. The data queues are allocated in the writer's local reflective memory 111. Entries in the queues can be pointers to the actual messages to be transmitted. In other words, the pointers in the queue entries index the actual data to be transmitted as messages. The entries can be sorted in the queues in an order of priorities associated with the data. This accommodates the problem where the number of priority levels available in the operating system is smaller than the number of priorities required by the applications. Effectively, the communication server 300 acts as a rate controller.

The DPA pushes out data via the queues in the order of the priorities. For example, no messages will be pushed via queue 314 as long as there messages in any of the queues 311–313. A flag (F) is associated with each of the queues 311–314 to determine if the queue is empty or not.

During operation of the server 300, reader and writer tasks "register" with the server using the manager 330 and requests 301. In other words, tasks "attach" and "detach" with the server 300 using the manager 330. The manager maintains a database 331 storing task specific parameters, such as timing information, and task identities (IDs).

The registration process calculates appropriate timer parameters 302 associated with the requests to define maximum permissible delays, as described above. The callback facility uses the timer parameters to activate system level timers that generate periodic promotion time-out signals 303 when a message needs to be pushed out at a high priority. Communication between the callback facility 340 and the dispatcher 310 can use standard operating system messaging primitives.

Writer tasks store data in ring buffers 304. The ring buffers are allocated in the reflective memory 111 by the manager 330 in response to requests by the tasks. As described below, data are stored in the ring buffers as fixed size messages 350. Pointers to the messages are stored in the queues 311–314 according to the corresponding priorities $P^{one}$–$P^{four}$.

The DPA normally pushes out real-time data in priority band $P^{four}$ via queue 314. The system schedules the DPA to push data only when there are no tasks executing at higher priority bands. Non real-time data can be pushed out via queue 313 using standard static round robin scheduling at priority $P^{three}$. Real-time data in the highest priority band $P^{one}$ is always pushed out via queue 311.

When a low priority real-time data needs to be "promoted" to a high priority because of an imminent timing deadline, the dispatcher moves (305) the pointer from queue 314 to queue 312. This is done in response to the callback activated promotion time-out signal 303.

The separation of the operations of the dispatcher 310 and the DPA 113, minimizes priority inversion at the socket or communication channel level by ensuring that high priority data push requests suffer blocking time due to priority inversion for only the duration of pushing one message of size $S^0$. Message sizes $S^0$ are described below.

Our main focus is the scheduling of the writer task, the reader task, and the DPA 113. The DRA 123 is scheduled using a simple event driven model, that is, we do not explicitly account for the priority of the received messages.

In order to support tasks with end-to-end timing constraints, we ensure that the task priorities, and the message sending priorities are consistent. This way, messages of a high priority task will not be blocked by the transmission of messages of a low priority task for an unpredictable amount of time. As stated above, general purpose operating systems do not support such priority tracking. To alleviate this problem, we have developed our server-based approach for communication over sockets.

The server 300 is a message transmission manager. All network communications are handled by the server. The server knows the priorities of the tasks that are requesting message transmission and schedules the DPAs that push data onto the network in such a way that priority tracking is achieved.

It is worth noting that many real-time schedulers only schedule with respect to an abstract notion of time, thereby simply acting as "capacity" managers. In contrast, our communication server not only schedules the data transfers, but also actually carries out the communications on behalf of the tasks. This allows our system to alleviate the priority inversion problem for data transfer.

Specifically, we provide user level interfaces to specify the timing and data message size requirements of a task. The server handles the socket establishment, and schedules the data transmission according to the specification. Allowing users to specify the requirements of task components in terms of timing, data, and relationships among tasks, such as periods, rates, data size, delay, response bounds, and precedence relations is a much more intuitive and effective proposition than requiring task designers to assign relative priorities to their tasks.

The user specified real-time requirements are translated into unique priority levels to be used within the server. This approach also alleviates the problem of limited priority levels supported by a typical operating system. Thus, we assign and manage priorities of tasks explicitly in our server, while providing the users with the ability to specify task timing, message size and precedence, and synchronization constraints.

In summary, our server minimizes the effect of priority inversion, handles priority tracking with limited operating system priority levels, and permits user specified timing requirements.

Integrating Real-Time and Non-Real-Time Task Activities

Our server 300 uses a modified dual priority scheduling procedure to accommodate different real-time and non-real-time task activities. Typical activities to be supported include the following. With command and control activities, users sporadically issue commands and need immediate data transmission, and delay bounded data reception. Video/audio applications require data transmissions with low jitter display. With device and instrument monitoring, data are acquired periodically, but some signals, such as alarms, require immediate attention. Trend graph rely on periodic data collection and transmission, and periodic data display. Most background activities only require best effort data transmission and reception.

Some of these tasks have real-time constraints, while others may have no real-time requirements. The real-time tasks demand synchronous (S) or asynchronous (A) data transmission and blocking (B) or non-blocking (N) data reception. In general, the synchronous tasks constitute the more urgent time critical tasks, while the asynchronous ones are periodic in nature. The non-real-time activities can be serviced with best effort. Based on these observations, we have developed the following scheme for mapping tasks into a set of unique priorities, one for each task type, namely, SB real-time, AN real-time, and non-real-time.

All SB tasks are assigned to the $P^{one}$ band, and will have priorities according to a deadline monotonic algorithm. That is, within the $P^{one}$ band, SB tasks have unique priorities determined by the deadlines of the SB tasks. In many tasks, e.g., plant monitoring, there are only one or two such entities in a system.

All AN data with timing constraints are initially assigned to priority $P^{four}$ band according to the deadline monotonic algorithm, and promoted to $P^{two}$ when a deadline is imminent. All the non real-time tasks are assigned a priority in the $P^{three}$ band. These priorities can either be assigned according to their requested execution rate, or randomly when the tasks do not specify any rate.

Dual Priority Scheduling

Dual priority scheduling executes real-time tasks such that the tasks will not miss their timing constraints while at the same time improving the responsiveness of the system to non real-time tasks. This is in contrast with always giving real-time tasks the higher priority. To this end, each real-time task normally executes with a priority lower than the priorities assigned to non real-time tasks.

When the time comes for a real-time task to execute in preference to a non real-time task, so that the real-time task will not miss its deadline, the priority of the real-time task is increased to be above that of the non real-time task. This time, called the priority promotion time, $PT_i$, for each invocation of a task $T_i$ with deadline $D_i$, is determined according to the following formulation, where $R_i$ is the response time, $w_i$ is the blocking time, $J_i$ is the release jitter, C is the total compute time, and hp(i) is the set of tasks with priorities higher than $T_j$:

$$PT_i = D_i - R_i$$

$$R_i = w_i + J_i$$

$$w_i^{m+1} = C_i + S^0 + \Sigma_{j \in hp(i)} \lceil (w_i^m + J_j)/T_j \rceil C_j$$

and where the iterations start with $w_i^0 = 0$, and ends when $w_i^{m+1} = w_i^m$, or $w_i^{m+1} > D_i$. Thus, promotion times take into consideration the release jitter $J_i$ described below, and a one-quantum blocking time $S^0$ that is due to the transmission of uniform sized messages from a lower priority task, also described below.

In other words, the server executes at the lowest priority $P^{four}$ while servicing real-time tasks, until one of two events happens, the arrival of a request to serve a non-real-time task, or the occurrence of the promotion time of a real-time task.

Upon the arrival of a request to service a non-real-time task, the priority of the server can be raised to $P^{three}$, and stays at $P^{three}$ as long as there are any non-real-time tasks to service, or until the promotion time of one or more real-time tasks occurs. When the promotion time of one or more real-time tasks occurs, the priority of the server is raised to $P^{two}$, or $P^{one}$ depending on whether the task is an SB task or an AN task. In some sense, the priority $P^{one}$ can be viewed as lying at the high-end of the $P^{two}$ band.

In summary, the server services all the communication tasks according to their respective periodicity, data size, and priority. It implements the dual priority algorithm such that task data communications are explicitly scheduled within the server.

Rate Controlled Uniform Size Message

Using the server described above, there is still a possibility of a high priority data being blocked by lower priority data for the duration of the time that it takes to transmit the lower priority data. In the worst case, this blocking time can be quite long where message sizes are not bounded. To limit this blocking time to a small quantum, we transmit data as fixed size messages. This allows transmission with fixed preemption points. This way, high priority data will be blocked no longer than it takes to transmit the fixed size message.

The optimal message size for a particular system configuration can be determined empirically by, for example, a profiler. The message size will serve as the non-preemptive unit of computation time and transmission time. Henceforth, the term $S^0$ can serve as either the unit message size, or the time needed to send and receive a message of this size. All data pushed are organized into messages of unit size $S^0$.

Profiler

To service real-time tasks, we need to know the computation time, communication overhead and propagation delay for the scheduler to be effective. Our solution is to use profiling at system configuration time on the specific nodes that our scheduler is used. The profiler includes two tasks that collect timing information as data are transferred in an operational system.

A first profiler task (P1 in FIG. 1) determines the end-to-end timing parameters of different entities in the network, for example, the individual tasks and agents. Other profiling data that can be collected include memory-to-memory round trip time, computation time and overhead of asynchronous DPA server scheduler, jitter introduced at each stage of the data path, time to complete read and write calls, time to push the data, and optimal size for messages. A second profiler task (P2) can determine throughput at the reader node. This information can be used to tune memory allocations.

In summary, we provided a system that allows both real-time and non-real-time tasks to execute concurrently on standard off-the-shelf hardware and software components. Our system does not require an apriori knowledge of the specific processor speed, or the knowledge of network propagation delay.

In particular, we present user-level scheduling schemes for communicating tasks that are practical and are based on simple primitives that can be found in most of today's commonly used operating systems. The scheduling schemes comprise a combination of server-based execution, rate control of message communication, and dual priority scheduling. In addition, it is well known that in order to predictably schedule real-time activities the worst case execution time is required. To obtain these times, we provide a profiler together with our scheduler support to extract the execution time and message delay parameters for the server components.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A multi-tasking system, comprising:
   a writer task generating real-time and non real-time messages having multiple priority levels in an ascending order arranged in a plurality of priority bands, the real-time messages having predetermined timing deadlines;
   a plurality of queues for indexing the messages using pointers, there being one queue for each priority band;
   a dispatcher moving pointers from a lower priority queue to a higher priority queue in response to a time-out signal dependent on the timing deadline; and
   a data push agent transmitting the messages indexed by the pointers according to the multiple priority levels.

2. The system of claim 1 including a reader task receiving the transmitted messages.

3. The system of claim 1 wherein there are four priority bands and a first, second, third and fourth queue, and the real-time messages are indexed by pointers in first, second, and fourth queue, and the non real-time messages are indexed by pointer in the third queue.

4. The system of claim 1 wherein the messages have a fixed size.

5. The system of claim 2 wherein the writer task and reader tasks execute on different computer systems connected by a network.

6. The system of claim 1 wherein the messages are stored in ring buffers of a reflective memory.

7. The system of claim 1 wherein each queue includes a flag to determine if the queue stores any messages.

8. The system of claim 3 wherein the time-out signal is activated by a callback facility of the dispatcher.

9. The system of claim 6 further including a manager for registering the writer and reader tasks and allocating the ring buffers.

10. The system of claim 1 wherein the non real-time messages are transmitted using round robin scheduling.

11. The system of claim 3 wherein synchronous blocking real-time messages are assigned to the first priority band, asynchronous non-blocking real-time messages are assigned to the second priority band, and non real-time messages are assigned to the third priority band.

12. The system of claim 1 including a profiler for collecting timing data while transmitting the messages.

13. A method for scheduling message transmission in a multi-tasking system, comprising the steps of:

generating real-time and non real-time messages having multiple priority levels in an ascending order arranged in a plurality of priority bands, the real-time messages having predetermined timing deadlines;

indexing the messages using pointers stored in queues, there being one queue for each priority band;

pointers from a lower priority queue to a higher priority queue in response to a time-out signal dependent on the timing deadline; and transmitting the messages indexed by the pointers according to the multiple priority levels.

* * * * *